(12) United States Patent
Oki et al.

(10) Patent No.: US 11,313,798 B2
(45) Date of Patent: Apr. 26, 2022

(54) OPTICAL MEASURING DEVICE, LIGHT GUIDE MEMBER, AND OPTICAL MEASURING METHOD

(71) Applicants: KYUSHU UNIVERSITY, NATIONAL UNIVERSITY CORPORATION, Fukuoka (JP); Ushio Denki Kabushiki Kaisha, Tokyo (JP)

(72) Inventors: Yuji Oki, Fukuoka (JP); Kinichi Morita, Tokyo (JP)

(73) Assignees: KYUSHU UNIVERSITY, NATIONAL UNIVERSITY CORPORATION, Fukuoka (JP); Ushio Denki Kabushiki Kaisha, Tokyo (JP)

(*) Notice: Subject to any disclaimer, the term of this patent is extended or adjusted under 35 U.S.C. 154(b) by 331 days.

(21) Appl. No.: 16/628,245

(22) PCT Filed: Jun. 29, 2018

(86) PCT No.: PCT/JP2018/024869
§ 371 (c)(1),
(2) Date: Jan. 2, 2020

(87) PCT Pub. No.: WO2019/009209
PCT Pub. Date: Jan. 10, 2019

(65) Prior Publication Data
US 2020/0173920 A1    Jun. 4, 2020

(30) Foreign Application Priority Data

Jul. 4, 2017  (JP) ............................. JP2017-131126
Nov. 30, 2017 (JP) ............................. JP2017-231195

(51) Int. Cl.
*G01N 21/59* (2006.01)
*G02B 6/10* (2006.01)

(52) U.S. Cl.
CPC ....... *G01N 21/59* (2013.01); *G01N 2201/064* (2013.01)

(58) Field of Classification Search
CPC ............. G01N 21/59; G01N 2201/064; G01N 2201/08; G01N 21/255; G01N 21/6402; G02B 6/0008; G02B 6/10; G02B 6/262
See application file for complete search history.

(56) References Cited

U.S. PATENT DOCUMENTS 7,565,042 B2 * 7/2009 Tang .................. G01N 21/0303
                                                    385/12
9,683,936 B2    6/2017 Oki et al.
(Continued)

FOREIGN PATENT DOCUMENTS

EP    1234169 B1    2/2008
EP    2881726 B1    3/2017
(Continued)

OTHER PUBLICATIONS

International Search Report issued in PCT/JP2018/024869; dated Sep. 18, 2018.
(Continued)

*Primary Examiner* — Seung C Sohn
(74) *Attorney, Agent, or Firm* — Studebaker & Brackett PC

(57) ABSTRACT

An optical measuring device for measuring light emitted from a sample includes a container cavity for receiving a container in which the sample is enclosed; a light detection unit for detecting light from the sample; a light guide path for guiding the light from the sample to the light detection unit; and a light absorbing unit for absorbing incident light. An end of the light guide path to receive the incident light faces the container cavity, a light exit end of the light guide path faces the light detection unit, and the light absorbing unit covers the perimeter of the light guide path other than the light-receiving-end and the light exit end thereof.

9 Claims, 7 Drawing Sheets

(56) References Cited

U.S. PATENT DOCUMENTS

| | | |
|---|---|---|
| 2005/0106746 A1 | 5/2005 | Shinn et al. |
| 2018/0217052 A1 | 8/2018 | Taniguchi et al. |

FOREIGN PATENT DOCUMENTS

| | | |
|---|---|---|
| JP | H07-63607 A | 3/1995 |
| JP | H08-54338 A | 2/1996 |
| JP | 2000-028526 A | 1/2000 |
| JP | 2003-515160 A | 4/2003 |
| JP | 3765518 B2 | 4/2006 |
| JP | 2006-300564 A | 11/2006 |
| JP | 5665811 B2 | 2/2015 |
| WO | 0138854 A1 | 5/2001 |
| WO | 2017051638 A1 | 3/2017 |

OTHER PUBLICATIONS

An Office Action; "Notice of Reasons for Refusal", mailed by the Japanese Patent Office dated Nov. 10, 2020, which corresponds to Japanese Patent Application No. 2017-231195 and is related to U.S. Appl. No. 16/628,245 ; with English language translation.

\* cited by examiner

OPTICAL MEASURING DEVICE, LIGHT GUIDE MEMBER, AND OPTICAL MEASURING METHOD

TECHNICAL FIELD

The present invention relates to an optical measurement device or apparatus, a light guide member, and an optical measurement method.

BACKGROUND ART

In an optical measurement apparatus, an S/N ratio is one of important factors that affect the measurement accuracy. Light (S) detected by a photodetector (referred to as "detection light") includes noise light (N) in addition to light from a sample to be measured. For example, the external light and the scattered light, which derives from the external light, entering the photodetector from the outside of the optical measurement apparatus without passing through the sample are examples of the noise light (N).

Therefore, in a common conventional optical measurement apparatus, at least a sample container and the photodetector are completely covered with a light-shielding housing at the time of optical measurement. In this case, there is a requisite that the housing must be at least large enough to accommodate the sample container.

Some of the sample containers used for the optical measurement have an overall length as large as a hundred and tens of mm (Patent Literature Document 1), and it is difficult to miniaturize the optical measurement apparatus under the above-mentioned requisite.

LISTING OF REFERENCES

Patent Literature Documents

Patent Literature Document 1: Japanese Patent No. 3765518

Patent Literature Document 2: Japanese Patent No. 5665811

SUMMARY OF THE INVENTION

Problems to be Solved by the Invention

It is therefore an object of the present invention to provide an optical measurement apparatus or the like capable of having an increased S/N ratio in measurement even if a sample is not completely covered with a housing.

Solution to the Problems

A first aspect of the present invention provides an optical measurement apparatus for measuring light from a sample, the apparatus including: a container cavity for receiving a container that contains the sample; a light detection unit for detecting light from the sample; a light guide path for guiding the light from the sample to the light detection unit; and a light absorbing unit for absorbing incident light. A light entrance end of the light guide path is optically connected to the container cavity or optically connected to the container cavity via a transparent resin that transmits the light from the sample. A light exit end of the light guide path is optically connected to the light detection unit, and the light absorbing unit covers at least a part of a periphery of the light guide path other than the light entrance end and the light exit end. A ratio of a square root of an area (A) of the light entrance end to a distance (L) from the light entrance end to the light exit end is 0.2 or less.

According to a second aspect of the present invention, provided is the optical measurement apparatus according to the first aspect of the invention, wherein the square root of the area (A) of the light entrance end is 80 μm or more.

According to a third aspect of the present invention, provided is the optical measurement apparatus according to the first or second aspect of the invention, wherein the light guide path is a group of light guide paths.

According to a fourth aspect of the present invention, provided is the optical measurement apparatus according to any one of the first aspect to the third aspect of the invention, wherein the light guide path and the light absorbing unit are made of the same resin.

A fifth aspect of the present invention provides a light guide member for guiding light from a sample, the light guide member including: a container cavity for receiving a container that contains the sample; a light guide path for guiding light from the sample; and a light absorbing unit for absorbing incident light. A light entrance end of the light guide path is optically connected to the container cavity or optically connected to the container cavity via a transparent resin that transmits light from the sample. The light absorbing unit covers at least a part of a periphery of the light guide path other than the light entrance end and the light exit end of the light guide path. A ratio of a square root of an area (A) of the light entrance end to a distance (L) from the light entrance end to the light exit end is 0.2 or less.

A sixth aspect of the present invention provides an optical measurement apparatus for measuring light from a sample, the apparatus including: a container cavity for receiving a container that contains the sample; a light detection unit for detecting light from the sample; a light guide path group, which is defined by a plurality of light guide paths, each having a light entrance end facing the container cavity and a light exit end facing the light detection unit and configured to guide light from the sample to the light detection unit; and a light absorbing unit for absorbing incident light. The light absorbing unit covers at least a part of a periphery of each light guide path other than the light entrance end and the light exit end of the light guide path concerned. The light entrance end is optically connected to the container cavity or optically connected to the container cavity via a transparent resin that transmits light from the sample.

According to a seventh aspect of the present invention, provided is the optical measurement apparatus according to the sixth aspect of the invention, further including a light source for irradiating the sample with light, and an optical multilayer filter disposed between the light entrance ends and the light exit ends of the light guide path group.

According to an eighth aspect of the present invention, provided is the optical measurement apparatus according to the seven aspect of the invention, further including a color glass filter that absorbs light having a specific wavelength, the color glass filter being disposed between the optical multilayer filter and the light exit ends of the light guide path group.

According to a ninth aspect of the present invention, provided is the optical measurement apparatus according to the eighth aspect of the invention, wherein each light guide path includes a silicone resin portion that transmits light from the sample, and optical material particles dispersed in the silicone resin portion, and a refractive index of the silicone resin portion and a refractive index of the optical material particles coincide with each other at a first wavelength, and do not coincide at a second wavelength different from the first wavelength.

A tenth aspect of the present invention provides an optical measurement method for measuring light from a sample, the method including: an irradiation step of emitting light to a light guide path group, which is defined by a plurality of light guide paths; and a detection step of collectively detecting light from the light guide paths of the light guide path group. A light absorbing unit, which absorbs light, covers a periphery of each light guide path except for a light entrance end and a light exit end.

Advantageous Effects of the Invention

According to each aspect of the present invention, even if the sample container is not completely housed in the housing, it is possible to perform light measurement in which the ratio of the detection light (S) to the noise light is sufficiently high. As a result, even if the sample container is large, the optical measurement apparatus can be small.

It is necessary for the conventional optical measurement apparatus to close a lid in order to shut off the external light after the sample is inserted into the optical measurement apparatus. On the other hand, it is not necessary for the optical measurement apparatus of the present invention to close and open the lid. Therefore, the work load is small, and the operability is good.

According to the third aspect of the present invention, it is possible to perform light measurement at a sufficiently high S/N ratio while obtaining the required detection light intensity.

According to the fourth aspect of the present invention, it is possible to suppress light scattering at the interface between the light guide path and the light absorbing unit.

According to the seventh aspect of the present invention, it is possible to provide a small-sized optical measurement apparatus even if the optical measurement apparatus includes the optical multilayer filter. Conventionally, if an optical measurement apparatus includes an optical multilayer filter, an optical lens is required to make the incident angle to the optical multilayer filter to 0 degree. However, according to the seventh aspect of the present invention, the incident angle of the light incident on the optical multilayer filter can be made 0 degrees by the light guide path group. Thus, an optical lens for making the incident angle to 0 degree becomes unnecessary, and the light measurement apparatus can be designed even smaller.

According to the eighth or ninth aspect of the present invention, noise light can be further reduced.

DESCRIPTION OF EMBODIMENTS

Hereinafter, embodiments of the present invention will be described with reference to the drawings. The embodiments of the present invention are not limited to the following examples.

Embodiment 1

In this embodiment, an optical measurement apparatus manufactured by using the SOT technique will be described. In recent years, there has been a demand for downsizing of optical measurement apparatus using optical analysis techniques such as absorption spectroscopy and laser-induced fluorescent spectroscopy when the optical measurement apparatus is used in, for example, point-of-care testing (POCT) in the life sciences field.

The inventors have proposed an optical measurement apparatus that meets such requirements. One of the examples is an LIF (Laser-induced fluorescence) device corresponding to POCT disclosed in Patent Literature Document 1. In the LIF device, the optical system including the optical path is made of a silicone resin. A resin transparent to the irradiation light (excitation light) and the observation light is loaded in a part of the light guide path. Then, a resin containing a pigment having a characteristic of absorbing stray light is provided so as to surround the transparent resin.

By making the transparent resin and the pigment-containing resin from the same material, the following advantages can be obtained. First, reflection and scattering at the interface between the transparent resin and the pigment-containing resin are suppressed. Second, the stray light incident on the pigment-containing resin is absorbed by the pigment-containing resin itself, and hardly returns to the light guide path. Thus, complicated multiple reflection of the stray light hardly occurs.

Therefore, the optical system of the optical measurement apparatus does not need to cope with complicated multiple reflection. Consequently, the optical system can be made compact and simple. As a result, the optical measurement apparatus can be made compact. The technique of preparing the optical system constructed of the above-mentioned silicone resins is called SOT (Silicone Optical Technologies).

The optical system using the SOT technique can be used in an optical measurement apparatus other than the LIF device. For example, the optical system using the SOT technology may be applicable to an absorbance meter 1 shown in FIG. 1.

Figure 1:
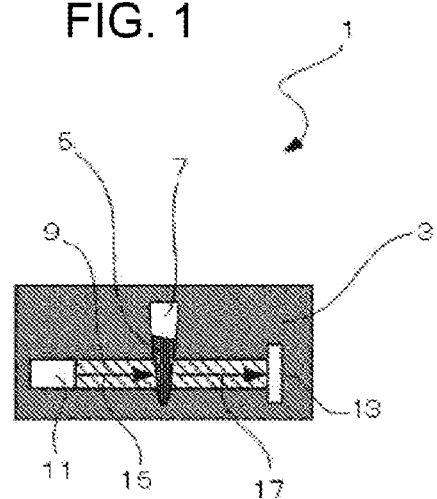
FIG. 1 shows an absorbance meter that has an SOT structure.

The absorbance meter 1 of FIG. 1 includes a light-shielding housing 3 (housing made of a pigment-containing resin), a light guide path 9 with a PCR tube 7 containing a sample (object to be measured) 5, a light source 11 such as an LED disposed at one end of the light guide path 9, and a light-receiving sensor 13 disposed at the other end of the light guide path 9. The light guide path 9, the PCR tube 7, the light source 11 and the light-receiving sensor 13 are disposed in the housing 3. The light guide path 9 is made of a transparent resin that is transparent to irradiation light 15 emitted from the light source 11 and directed to the sample 5 contained in the PCR tube 7, and observation light 17 emitted from the sample 5 irradiated with the irradiation light 15.

The light guide path 9 may not be filled with a transparent resin, but may be left as a hollow space or cavity. In that case, although an advantage of suppressing the stray light reflection at the interface between the light guide path 9 and the housing 3, which is made of a pigment-containing resin and surrounds the light guide path 9, is not obtained, the stray light incident to the pigment-containing resin is absorbed by the pigment-containing resin. Thus, the stray light is little returned to the light guide path 9 or the hollow space. Accordingly, a complex multiple reflection of the stray light is "suppressed" to some extent.

Since the SOT structure is a structure in which the light guide path is surrounded by the pigment-containing resin, external light from the outside does not reach the light guide path. For example, in the LIF device of Patent Literature Document 1 or the absorbance meter 1 shown in FIG. 1, external light from the outside does not reach the light guide path.

Figure 2:
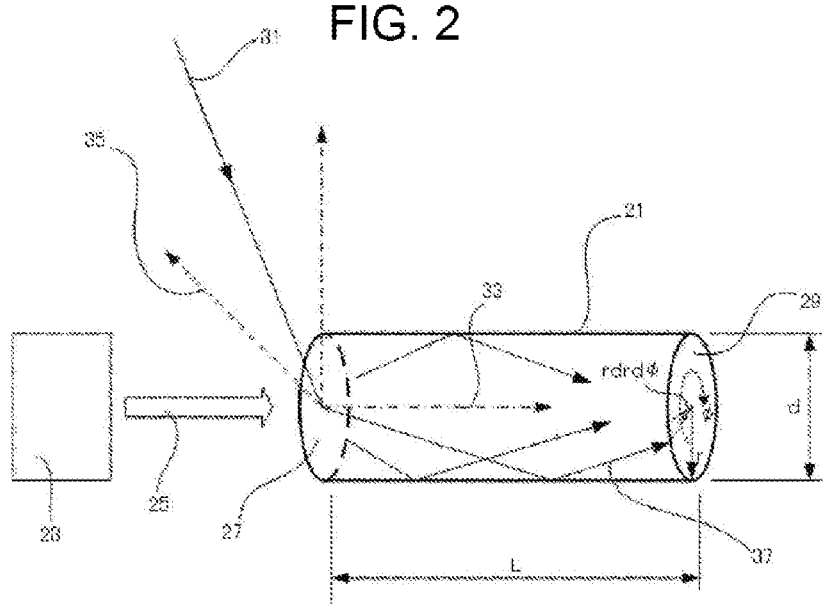
FIG. 2 is a schematic diagram of a light guide and a light emitting source of a light measuring apparatus according to an embodiment of the present invention.

FIG. 2 is a schematic view of the light guide path 21 and the light emitting source 23 of the light measuring apparatus according to the embodiment of the present invention. The light emitting source 23 emits measurement light 25 used for measurement.

The light guide path 21 is made of a transparent resin that transmits the measurement light 25. The periphery of the light guide path 21 is covered with a pigment-containing resin (not shown). Since the light emitting source 23 is disposed at a position that faces the light entrance end (light incident opening) 27 of the light guide path 21, it is considered that the measurement light 25 that enters the light guide 21 includes a large number of straight-travelling light components, as shown in FIG. 2.

Of the light passing through the light entrance end 27 of the light guide path 21 and traveling to the light exit end 29, there is also light reaching the light exit end 29 without being absorbed by the pigment-containing resin, although it is slight. This light reaches the exit end 29 of the light guide path 21 even if it is not straight-travelling light.

On the other hand, the external light or light from outside 31, which is unwanted for light measurement, hardly enters the light entrance end 27 from the normal direction 33 of the light entrance end 27. Although some of the light from outside 31 does not reach the light exit end 29 but becomes the external light 35, a part of the outside light 31 is scattered at the light entrance end 27 of the light guide path 21 and becomes the scattered light 37 that reaches the light exit end 29 of the light guide path 21.

As is apparent from FIG. 2, as the area (A) of the light entrance end 27 of the light guide path 21 becomes larger, an amount of light incident on the light guide path 21 becomes larger. Therefore, as the area (A) of the light entrance end 27 increases, both the intensity of the straight light traveling through the light guide path 21 and the intensity of the external light 31 scattered by the light entrance end 27 of the light guide path 21 and reaching the light exit end 29 in the form of scattered light increase.

The intensity dependence of the straight-traveling light on the area (A) of the light entrance end 27 and the intensity dependence of the external light 31 on the area (A) of the light entrance end 27 were examined First, as shown in FIG. 2, the light guide path 21 was assumed to have a cylindrical structure, and the intensity dependence of the external light 31 was obtained (calculated). Specifically, the length of the light guide path 21 having the cylindrical structure was L, the diameter of the light guide path 21 was d, the circular coordinates (r, φ) were set, and an amount of the external light 31 was obtained using the following equation (1).

$$\int_0^{\frac{d}{2}} \int_0^{2\pi} \frac{\sqrt{d^2+4L^2}\,(d-2r\cos[\phi])}{2L^2\pi L^2} r\,d\phi\,dr \qquad (1)$$

Assuming that the intensity of the external light scattered at the light entrance end 27 and reaching the light exit end 29 is R by approximation using the above equation, R is expressed by the following equations (2) and (3). Here, β is a constant.

$$R \propto \left(\frac{d}{L}\right)^3 \qquad (2)$$

$$R = \beta\left(\frac{d}{L}\right)^3 \qquad (3)$$

On the other hand, since the strength P of the straight-travelling light is proportional to the area $\pi(d/2)^2$ of the light guide path 21, it is expressed by the equation (4). Here, α is a constant.

$$P = \alpha\left(\frac{d}{2}\right)^2 \qquad (4)$$

Figure 3:
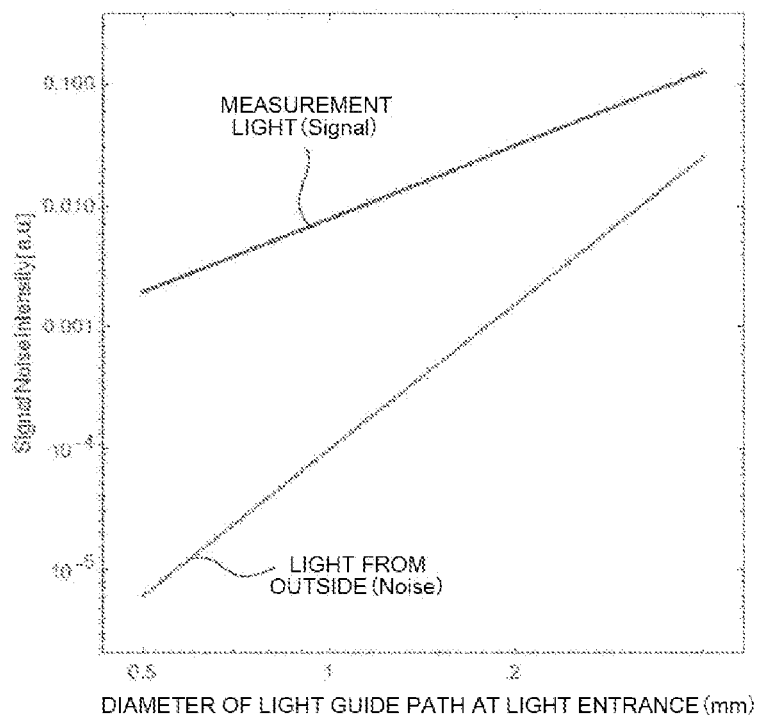
FIG. 3 shows the intensity of straight-travelling light and external light with respect to the diameter of the light guide path according to the embodiment of the present invention.

FIG. 3 shows the results of simulating the intensity of the straight-travelling light and the external light with respect to the diameter of the light guide path using the equations (3) and (4). As shown in FIG. 3, it was found that the increase of the intensity of the external light with respect to the increase of the diameter of the light guide path was larger than the increase of the intensity of the measurement light.

That is, it has been clarified that as the area (A) of the light entrance end is smaller, the ratio of S/N is improved.

Specifically, when the square root of the area (A) of the light entrance end of the light guide path and the distance (L) from the light entrance end to the light exit end satisfy the following equation (5), it is possible to easily perform optical measurement with a sufficiently high S/N ratio even in a state where the sample container is not completely covered by the housing.

$$\frac{\sqrt{A}}{L} \leq 0.4 \qquad (5)$$

In the SOT structure made from the silicone resin, for example, the area of the light entrance end of the light guide path which can be easily processed or machined is about 0.01 mm². When the inventors changed the length of the light guide path with the area of the light entrance end of the light guide path being fixed to 0.01 mm², the inventors observed that when the condition of the equation (5) was satisfied, it was possible to realize optical measurements with sufficiently high S/N ratios even when the sample container was not completely covered by the housing. Similar results were obtained when the area of the light entrance end of the light guide path was 1 mm².

In order to suppress or reduce diffractive losses when the light guide path has a square hole configuration, it is preferable that the expression (6) be satisfied where the width of one side of the square-shaped light entrance end is $d_s$. If the light guide path is a light guide path having a cylindrical hole (circular hole) structure, it is preferable that the expression (6') be satisfied where d is the diameter of the light entrance of the light guide path as described above.

$$L < \frac{d_s^2}{\lambda} \tag{6}$$

$$L < \frac{\pi\left(\frac{d}{2}\right)^2}{\lambda} \tag{6'}$$

Here, since the numerator of the formula (6) and the numerator of the formula (6') are both the area A of the light entrance end of the light guide path, the formulae (6) and (6') are finally expressed as the following formula (6").

$$L < \frac{A}{\lambda} \tag{6''}$$

Further, assuming that a light source having a wavelength between ultraviolet light wavelength and infrared light wavelength is used as the light source, and that the light guide path of a sufficiently small light measuring device is 1 cm or less, it is desirable that the expression (7) is satisfied in order to obtain a light intensity sufficient for light measurement. In this case, light measurement with a sufficiently high S/N ratio can be performed.

$$\sqrt{A} \geq 80 \text{ μm} \tag{7}$$

Embodiment 2

Figure 4:
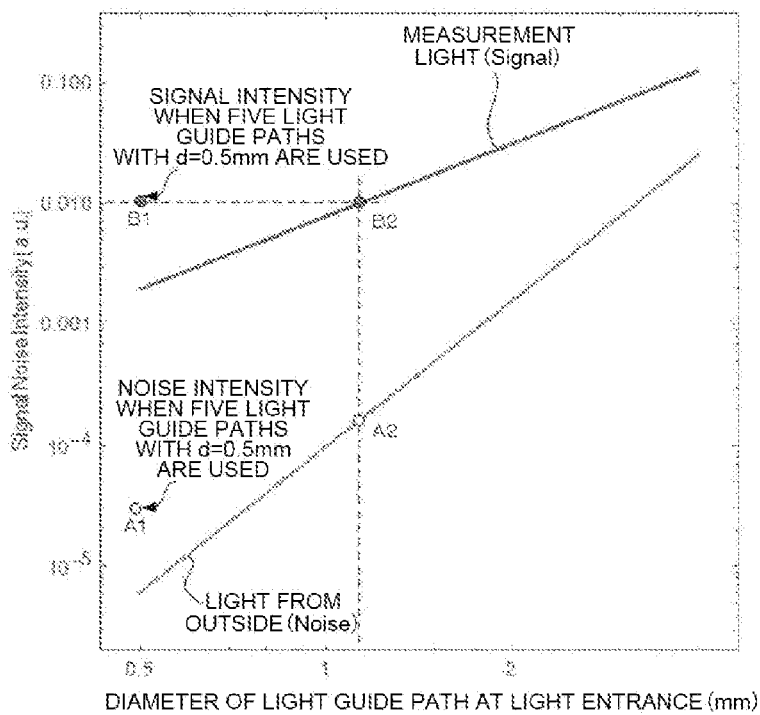
FIG. 4 shows the intensity of straight-travelling light and external light with respect to the diameter of the light guide path group when the light guide path group has five light guides, each having a diameter of 0.5 mm.

The optical measurement apparatus according to this embodiment includes a plurality of light guide paths. For example, it should be assumed that five light guide paths, each having a diameter of 0.5 mm, are used. Point A1 in FIG. 4 shows the external light intensity when five light guide paths having a diameter of 0.5 mm are used, and the value is five times the external light intensity when a single light guide path having a diameter of 0.5 mm is used. Point B1 in FIG. 4 represents the measurement light intensity when five light guide paths having a diameter of 0.5 mm are used, and is a value five times the measurement light intensity when a single light guide path having a diameter of 0.5 mm is used.

If the same measurement light intensity is obtained with a single light guide path as when using the five light guides with the diameter of 0.5 mm, the point B2 is plotted in FIG. 4, and the diameter of the light guide path is 1.18 mm. The external light intensity in the case of using a single light guide path having a diameter of 1.18 mm is the point A2 in FIG. 4. That is, the measurement light intensity in the case of the single light guide path (diameter: 1.18 mm) is the same as the measurement light intensity in the case of the five light guides (diameter: 0.5 mm each), as indicated by the point B2 and the point B1, but the external light intensity is smaller in the latter case than in the former case, as indicated by the point A2 and the point A1.

Assuming that the measurement light incident onto the light guide path is straight-travelling light, the intensity P of the straight-travelling light taken out from the light exit end of the light guide path having the diameter d is expressed by the equation (4), and the intensity R of the external light is expressed by the equation (3). Therefore, the intensity I(d) of the light extracted from the single light guide path having the diameter d is expressed by the following equation (8).

$$I(d) = P + R \tag{8}$$

In addition, the intensity P' of the straight-travelling light extracted from the light exit end of the light guide path having the diameter d/5 is expressed by the equation (9), the intensity R' of the external light is expressed by the equation (10), and the intensity I(d/5) of the light extracted from the single light guide path having the diameter d/5 is expressed by the equation (11).

$$P' = \alpha\left(\frac{1}{2} \times \frac{d}{5}\right)^2 = \left(\frac{1}{25}\right)P \tag{9}$$

$$R' = \beta\left(\frac{1}{L} \times \frac{d}{5}\right)^3 = \left(\frac{1}{125}\right)R \tag{10}$$

$$I\left(\frac{d}{5}\right) = P' + R' = \frac{1}{25}P + \frac{1}{125}R \tag{11}$$

As is obvious from the foregoing, when the intensity of the straight-travelling light taken out from the light exit end of the light guide path is made to be the same as the intensity of the light guide path having the diameter d, twenty-five light guide paths having the diameter d/5 are required. When the twenty-five light guide paths having the diameter d/5 are used, the intensity of external light becomes ⅕ of that of the light guide path having the diameter d.

Figure 5A:
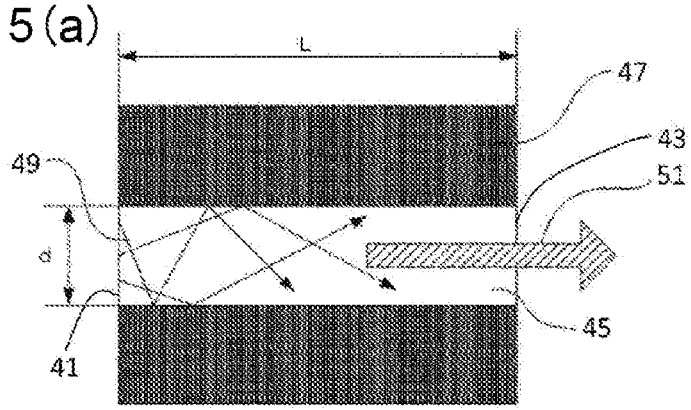
FIG. 5 is a set of schematic views, each showing a cross section of a light guide according to an embodiment of the present invention.
Figure 5B:
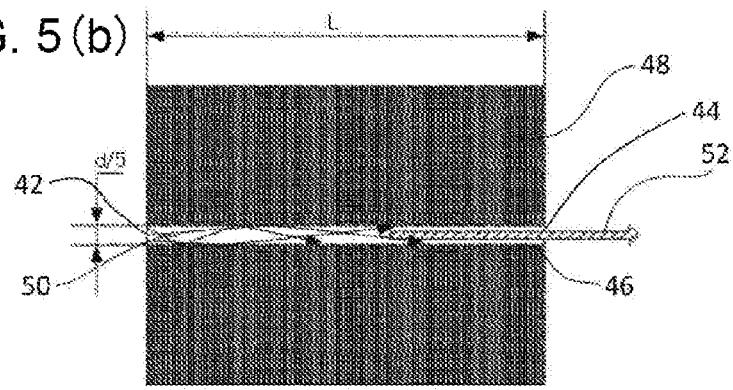

The above-described finding that the S/N ratio becomes greater by using a plurality of light guide paths than by using a single light guide path is applied to the SOT structure in the following description. FIG. 5 is a set of schematic diagrams each showing a cross-sectional view of a light guide path in the SOT structure. The light guide path 45 in FIG. 5(a) has a cylindrical shape. The distance from the light entrance end 41 to the exit end 43 is L, and the diameter is d. The light guide path 46 in FIG. 5(b) has a cylindrical shape. The distance from the light entrance end 42 to the light exit end 44 is L, and the diameter is d/5. The light guide paths 45 and 46 are surrounded by the pigment-containing resins 47 and 48, respectively, except for the light entrance ends 41 and 42 and the light exit ends 43 and 44.

In the case of the SOT structures shown in FIG. 5, if the light guide paths 45 and 46 are transparent silicone resins (i.e., resin that contains no pigment) made of the same material as the pigment-containing resins 47 and 48, reflection does not occur at the interface between the light guide paths 45 and 46 and the pigment-containing resins 47 and 48, as described above. Although the external light incident on the pigment and the scattered light incident on the pigment 49 and 50 are substantially absorbed, the external light and the scattered light 49 and 50 are scattered slightly on the surface of the pigment, and are extracted from the emission end (exit end of the light guide path) together with the straight-travelling light 51 and 52.

According to experiments conducted by the inventors, when L was 4 mm, the intensity of the scattered light 49 and 50 extracted from the light exit ends 43 and 44 was 0.01% of the intensity of the scattered light 49 and 50 at the light entrance ends 41 and 42.

Therefore, when the SOT structure is adopted and the light guide paths 45 and 46 are transparent silicone resins, the intensity of light extracted from the light guide path 45 having the diameter d is expressed by the equation (12), and the intensity of light extracted from the light guide path 46 having the diameter d/5 is expressed by the equation (13).

$$I(d, \text{SOT Transparent Silicone Resin}) = P + R - (1 - 0.0001)R = P + 0.0001R \quad (12)$$

$$I(d/5, \text{SOT Transparent Silicone Resin}) = P' + 0.0001R' = (1/25)P + (1/1250000)R \quad (13)$$

On the other hand, when the light guide path 45 is a cavity (air), the intensity of the scattered light 49 extracted from the emission end 43 of the light guide path 45 surrounded by the pigment-containing resin 47 is 10% of the intensity of the scattered light 49 at the light entrance end 41 of the light guide path 45 because reflection occurs at the interface between the light guide path 45 and the pigment-containing resin 47.

Therefore, when the SOT structure is employed and the light guide path 45 is a cavity (hollow space), the intensity of the light extracted from the light guide path 45 having the diameter d is expressed by the equation (14) and the intensity of the light extracted from the light guide path 45 having the diameter d/5 is expressed by the equation (15).

$$I(d, \text{SOT Cavity}) = P + R - (1 - 0.1)R = P + 0.1R \quad (14)$$

$$I(d/5, \text{SOT Cavity}) = P' + 0.1R' = (1/25)P + (1/1250)R \quad (15)$$

Here, it should be assumed that the intensity P of the straight-travelling light 51 when the diameter of the light guide path 45 is d is 3(au) and the intensity of the scattered light 49 is 2(au) (that is, the total intensity of the light incident on the light guide path 45 is 5(au)). Then, the intensity of the light extracted from the light guide path 45 and the intensity of the scattered light 49 (external light) are those as shown in the following table.

Tables

As is clear from the two tables, when the diameter of the light guide path 45 is d/5 and the light guide path is a group of twenty-five light guide paths, for example, the intensity of scattered light (external light) extracted from the exit end of the light guide path group can be reduced by 80% or can be reduced to 20% as compared with the case of using a single light guide path having the diameter d even when the SOT structure is not employed. In the case of an SOT structure in which the light guide group is a cavity, the intensity of scattered light can be reduced by 98% or can be reduced to 2%. Further, in the case of an SOT structure in which the light guide group is a transparent silicone resin of the same material as the pigment-containing resin, the intensity of the scattered light can be reduced by 99.998% or can be reduced to 0.002%.

Also in the SOT structure, if a single light guide path having a diameter d and having a cavity (air) is replaced with a group of twenty-five light guide paths made of a transparent silicone resin and having a diameter d/5, the scattered light intensity can be reduced to 0.02%. If the light guide path group is a group of ten light guide paths made of transparent silicone resin and having a diameter d/5, the intensity of light extracted from the light guide path group is reduced to about 40%, but the intensity of scattered light (external light) can be suppressed to 0.008% of that in the case of the cavity light guide path. Thus, highly accurate measurement can be performed.

In the SOT structure, if m ($<n^2$) light guide paths having a cylindrical shape with a diameter d are used instead of $n^2$ light guide paths having a cylindrical shape with a diameter d/n, the SOT structure can be measured with high accuracy (with an S/N ratio improved correspondingly). That is, in the SOT structure, the number of light guide paths can be set to a value that provides the required measurement light intensity and sufficiently reduces the S/N ratio of the measurement light intensity and the external light intensity.

Figure 6A:
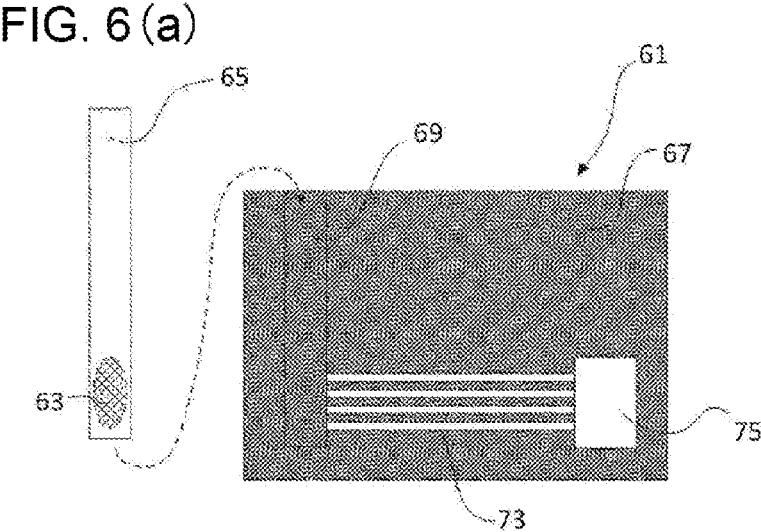
FIG. 6 is a set of diagrams, each showing a structure of an optical measurement apparatus according to an embodiment of the present invention.
Figure 6B:
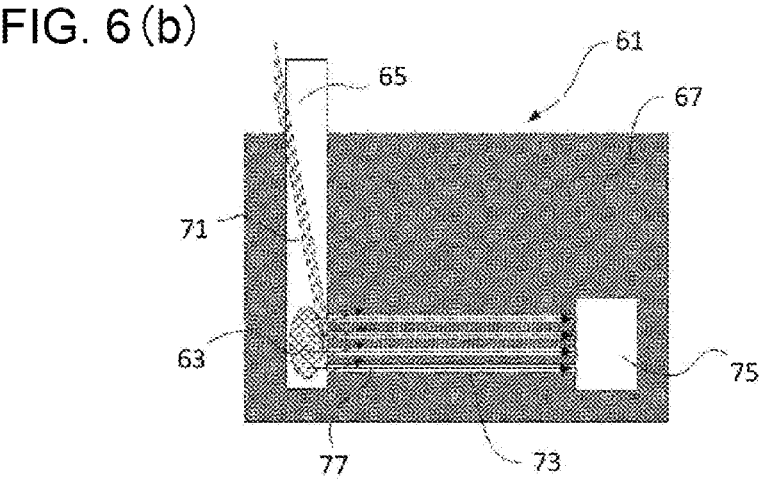

FIG. 6 shows examples of the structure of the optical measurement apparatus 61 of an embodiment of the invention. The optical measurement apparatus 61 has a structure in which a sample holder 65 including a light emitting body as disclosed in Patent Literature Document 2, for example, is detachable. As shown in FIG. 6(a), a sample holder

| Intensity of light extracted | | | | | | | | | |
|---|---|---|---|---|---|---|---|---|---|
| | d | d/5 | d/5 (25 paths) | d/4 | d/4 (16 paths) | d/3 | d/3 (9 paths) | d/2 | d/2 (4 paths) |
| NOT SOT | 5 | 0.136 | 3.4 | 0.219 | 3.5 | 0.407407 | 3.67 | 1 | 4 |
| SOT (Air) | 3.2 | 0.1216 | 3.04 | 0.191625 | 3.05 | 0.3407407 | 3.067 | 0.775 | 3.1 |
| SOT (Resin) | 3.002 | 0.1200016 | 3.00004 | 0.187503125 | 3.00005 | 0.33334074 | 3.000067 | 0.750025 | 3.0001 |

| Intensity of light scattered (external light) | | | | | | | | | |
|---|---|---|---|---|---|---|---|---|---|
| | d | d/5 | d/5 (25 paths) | d/4 | d/4 (16 paths) | d/3 | d/3 (9 paths) | d/2 | d/2 (4 paths) |
| NOT SOT | 2 (100%) | 0.016 (0.8%) | 0.4 (20%) | 0.031 (1.56%) | 0.5 (25%) | 0.074 (3.7%) | 0.67 (33.5%) | 0.25 (12.5%) | 1 (50%) |
| SOT (Air) | 0.2 (10%) | 0.0016 (0.08%) | 0.04 (2%) | 0.0031 (0.156%) | 0.05 (2.5%) | 0.0074 (0.37%) | 0.67 (3.35%) | 0.025 (0.125%) | 0.1 (5%) |
| SOT (Resin) | 0.002 (0.1%) | 0.0000016 (0.00008%) | 0.00004 (0.002%) | 0.0000031 (0.000156%) | 0.00005 (0.0025%) | 0.0000074 (0.00037%) | 0.00067 (0.0335%) | 0.000025 (0.00125%) | 0.0001 (0.005%) | accommodating portion 69 that can receive the sample holder 65 is disposed in a housing 67 made of a pigment-containing resin.

FIG. 6(*b*) shows a case where the sample holder 65 is received in the sample holder accommodating portion 69. In this drawing, the length of the sample holder 65 is a length that protrudes from the upper surface of the optical measurement device 61 when the sample holder 65 is received in the sample holder accommodating portion 69. Therefore, the external light 71 enters the sample holder 65 from the protruding portion of the sample holder 65.

The light guide path 73 is optically connected to the sample holder 65 such that the light guide path 73 can guide the light emitted from the light emitting portion or element 63 of the sample holder 65 to the optical sensor 75, for example, by contacting or adjoining the sample holder 65. In this way, the light emitted from the light emitting portion 63 of the sample holder 65 is guided to the optical sensor 75 via the light guide path 73. As described above, since the external light 71 is incident from the protruding portion of the sample holder 65, a part of the incident external light 71 is incident and scattered at the light entrance end of the light guide path 73, and a part of the scattered light enters the light guide path and guided to the optical sensor 75 together with the measurement light 77. In order to reduce the influence of the external light 71, a plurality of light guide paths connecting the light emitting section 63 to the optical sensor 75 are provided according to the above-described finding of the inventors. Although the number of the light guide paths 73 is four as shown in the drawing of this embodiment, the number of the light guide paths can be set such that the required measurement light intensity is obtained and the S/N ratio defined by the measurement light intensity and the intensity of the external light 71 is sufficiently small.

Figure 7:
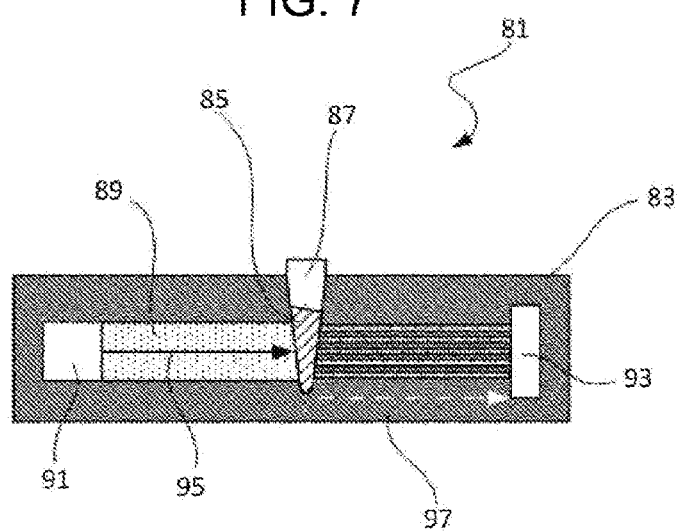
FIG. 7 illustrates a structure of an absorbance meter according to an embodiment of the present invention.

As shown in FIG. 7, it is may be assumed that the optical measurement apparatus of the present invention is an absorbance meter 81. The absorbance meter 81 includes a light-shielding housing 83 (housing made of a pigment-containing resin), a light guide path 89 in which a PCR tube 87 containing a sample 85 is installed, a light source 91 such as an LED disposed at one end of the light guide path 89, and a light-receiving sensor 93 disposed at the other end of the light guide path 89. The light guide path 89, the light source 91, and the light-receiving sensor 93 are disposed in the housing 83. The light guide path 89 is a light guide filled with transparent resin that is transparent to the irradiation light 95 emitted from the light source 91 and directed to the sample 85 contained in the PCR tube 87, and the observation light 97 emitted from the sample 85 as the sample 85 is irradiated with the irradiation light 95.

Embodiment 3

Figure 8:
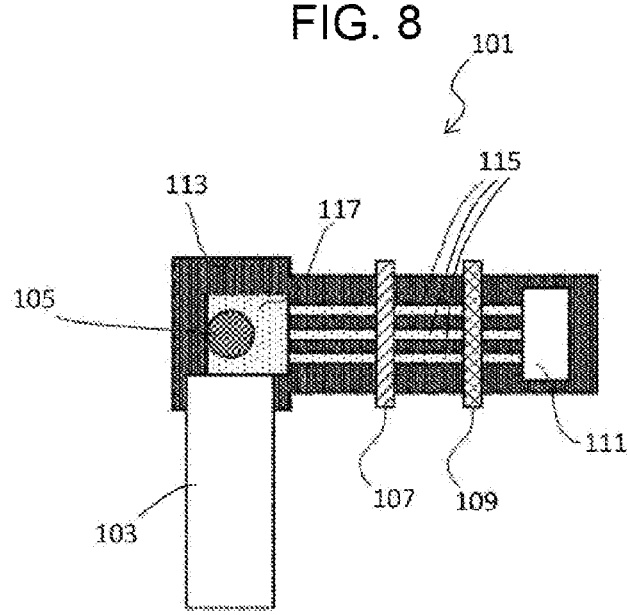
FIG. 8 illustrates a structure of an LIF device according to a third embodiment of the present invention.

FIG. 8 shows an exemplary configuration of the LIF device 101 including the light guide path group of the embodiment of the present invention. The LIF device 101 includes a light source 103 (e.g., a solid light source such as a laser light source) for emitting excitation light, a sample case 105 for holding a sample to be measured, a notch filter 107 (an example of an "optical multilayer filter" recited in the claims), a color glass filter 109, a light sensor 111 (e.g., a fluorometer such as a photomultiplier tube), and a pigment-containing resin portion 113, which are included in the LIF device disclosed in Patent Literature Document 2. The LIF device 101 further includes a light guide path group 115 including a plurality of light guide paths.

The sample case 105 is held in a light irradiation space 117 in the LIF device 101 at the time of measurement. The light irradiation space 117 is formed of a transparent silicone resin such as a PDMS resin which is transparent to irradiation light (excitation light) from the light source 103 and light including fluorescent light emitted from the sample held in the sample case 105. The irradiation light (excitation light) emitted from the light source 103 is directed to the sample held by the sample case 105 through the light irradiation space 117.

Each of the light guide paths constituting the light guide group 115 has, for example, a cylindrical shape made of the same material as the transparent silicone resin constituting the light irradiation space 117, and is provided so as to be optically connected to the light irradiation space 117, for example, in contact with or adjacent to the light irradiation space 117 at a side face of the light irradiation space extending in a direction different from the direction in which the irradiation light travels toward the sample case (for example, a direction orthogonal to the traveling direction). It should be noted that the light guide member may be a cavity instead of a transparent silicone resin.

The light emitting side of the light guide group 115 is optically connected to the optical sensor 111. The light irradiation space 117 and the respective light guide paths of the light guide path group 115 are surrounded by a silicone resin (hereinafter referred to as "pigment-containing silicone resin 113") that substantially uniformly contains a pigment having a wavelength characteristic that absorbs excitation light, autofluorescence generated when the sample case 105 is irradiated with the excitation light, and Raman light generated from the resin when the excitation light travels through the resin. In other words, the light irradiation space 117 and the pigment-containing silicone resin 113 make an SOT structure, and the light guide group 115 and the pigment-containing silicone resin 113 make an SOT structure.

The light source 103, the light sensor 111, and a power supply unit for supplying power to the light source 103 and the light sensor 111, which are not illustrated, may also be embedded in the pigment-containing silicone resin 113 as appropriate. Here, the light emitting surface of the light source 103 and the light receiving surface of the light sensor 111 are optically connected to the light irradiation space 117 and the light guide paths of the light guide group 115 without interposing the pigment-containing silicone resin 113.

The light guide paths of the light guide group 115 guide the observation light (fluorescence) emitted from the sample held by the sample case 105 to the optical sensor 111. The observation light (fluorescence) emitted from the sample enters the light guide paths of the light guide path group 115 optically connected to the light irradiation space 117 via the light irradiation space 117. However, not only observation light (fluorescence) but also noise light, such as stray light of the excitation light, autofluorescence from the sample case 105, and Raman light emitted when the excitation light passes through the transparent silicone resin, enter the light guide paths of the light guide group 115. Therefore, the notch filter 107 for reducing the noise light is disposed in the light guide paths between the light irradiation space 117 and the light sensor 111.

When the incident angle of the noise light to the notch filter 107 is 0°, the notch filter 107 most effectively attenuates the noise light. In the LIF device disclosed in Patent Literature Document 2, the incident angle of light to the notch filter is set to 0° by using an optical lens.

Here, each of the light guide paths of the light guide group 115 is configured, for example, in a cylindrical shape, and the diameter d is appropriately set, so that the light guided by the light guide group 115 becomes substantially straight-travelling light. Light that does not travel straight is absorbed by the pigment-containing silicone resin 113 surrounding the light guide paths of the light guide group 115. Therefore, by disposing the notch filter 107 at a position in the middle of the light guide group 115 and orthogonal to the direction in which the light guide group 115 extends, the incident angle of the noise light to the notch filter 107 becomes approximately 0°. Therefore, unlike the LIF device disclosed in Patent Literature Document 2, the LIF device 101 according to this embodiment of the invention does not require an optical lens.

As described above, by using the light guide group 115 of this embodiment of the invention, optical components such as lenses are not required, and the LIF device can be configured to be smaller. In addition, since the optical element such as the notch filter, and various components such as the sample case, the light source and the optical sensor are embedded in the pigment-containing silicone resin, the positions of the optical element and components do not easily shift even if vibration or impact is applied to the LIF device.

Since some of the noise light slightly may pass through the notch filter 107, a color glass filter 109 which absorbs the noise light and transmits the observation light (fluorescence) may be provided on the light emitting side of the notch filter 107.

Embodiment 4

Figure 9:
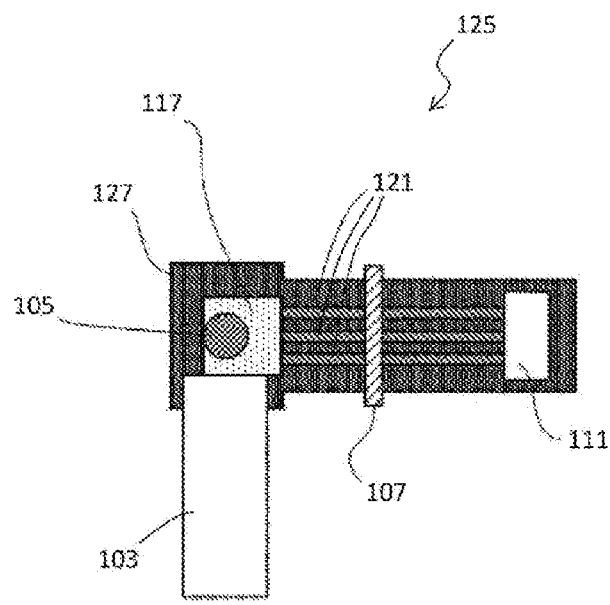
FIG. 9 illustrates a structure of an LIF device according to a fourth embodiment of the present invention.

FIG. 9 shows an exemplary configuration of a LIF device 125 in which a dye that absorbs noise light is dispersed in the light guide paths of the light guide group 121, instead of the color glass filter 109 of the LIF device 101 shown in FIG. 8. In the LIF device 125 of FIG. 9, the light guide paths themselves of the light guide path group 121 function similarly to the color glass filter, and can effectively attenuate the noise light.

When each of the light guide paths of the light guide group 121 is made of a silicone resin, there is a possibility that the dye dispersed in each light guide path passes through the interface with the adjacent pigment-containing silicone resin 127 and seeps into the pigment-containing silicone resin 127.

When such a problem needs to be avoided, it is preferable that a thin film of silicon oxide ($SiO_2$) be provided on the dye-dispersed silicone resin (silicone resin in which a dye is dispersed) by irradiating the dye-dispersed silicone resin with vacuum ultraviolet light having a wavelength of 172 nm, for example, prior to embedding a light guide path made of the dye-dispersed silicone resin in the pigment-containing silicone resin 127. If such configuration is employed, the silicon oxide thin film is interposed at the interface between the light guide path made of the dye-dispersed silicone resin and the pigment-containing silicone resin 127, and therefore the dye in the dye-dispersed silicone resin of the light guide paths does not seep into the inside of the pigment-containing silicone resin 127.

REFERENCE NUMERALS

1 . . . Absorbance meter
3 . . . Casing
5 . . . Sample
7 . . . PCR tube
9 . . . Light guide path
11 . . . Light source
13 . . . Light receiving sensor
15 . . . Irradiation light
17 . . . Observation light
21 . . . Light guide path
23 . . . Light emitting source
25 . . . Measurement light
27 . . . Light entrance end
29 . . . Light exit end
31 . . . External light
33 . . . Normal line direction
35 . . . External light that does not reach the light exit
37 . . . Scattered light
41 . . . Light entrance end
43 . . . Light exit end
45 . . . Light guide path
47 . . . Pigment-containing resin
49 . . . Scattered light
51 . . . Straight-travelling light
61 . . . Optical measuring apparatus
63 . . . Light emitting unit
65 . . . Sample holder
67 . . . Housing
69 . . . Sample holder receiving portion
71 . . . External light
73 . . . Light guide path
75 . . . Optical sensor
77 . . . Measurement light
81 . . . Absorbance meter
83 . . . Housing
85 . . . Sample
87 . . . PCR tube
89 . . . Light guide path
91 . . . Light source
93 . . . Light receiving sensor
95 . . . Irradiation light
97 . . . Observation light
101 . . . LIF device
103 . . . Light source
105 . . . Sample case
107 . . . Notch filter
109 . . . Color glass filter
111 . . . Optical sensor
113 . . . Pigment-containing resin portion
115 . . . Light guide path group
117 . . . Light irradiation space
121 . . . Light guide path group
125 . . . LIF device
127 . . . Pigment-containing silicone resin

The invention claimed is:

1. An optical measurement apparatus for measuring light from a sample, the apparatus comprising:
a container cavity for receiving a container that contains the sample;
a light detection unit for detecting light from the sample;
a light guide path group, which is defined by a plurality of light guide path groups, for guiding the light from the sample to the light detection unit; and
a light absorbing unit for absorbing incident light,
each of said plurality of light guide paths having a light entrance end and a light exit end,
the light entrance end of each said light guide path being optically connected to the container cavity or optically connected to the container cavity via a transparent resin that transmits the light from the sample, the light exit end of each said light guide path being optically connected to the light detection unit, and the light absorbing unit covering at least a part of a periphery of each said light guide path other than the light entrance end and the light exit end of the light guide path concerned.

2. The optical measurement apparatus according to claim 1, wherein said plurality of light guide paths have a same optical path length from the sample to the light detection unit.

3. The optical measurement apparatus according to claim 1, wherein said plurality of light guide paths and the light absorbing unit are made of a same resin.

4. A light guide member for guiding light from a sample, the light guide member comprising:

a container cavity for receiving a container that contains the sample;

a light guide path group, which is defined by a plurality of light guide path groups, for guiding light from the sample; and a light absorbing unit for absorbing incident light, each of said plurality of light guide paths having a light entrance end and a light exit end, the light entrance end of each said light guide path being optically connected to the container cavity or optically connected to the container cavity via a transparent resin that transmits the light from the sample, and the light absorbing unit covering at least a part of a periphery of each said light guide path other than the light entrance end and the light exit end of the light guide path concerned.

5. An optical measurement apparatus for measuring light from a sample, the apparatus comprising:

a container cavity for receiving a container that contains the sample;

a light detection unit for detecting light from the sample;

a light guide path group, which is defined by a plurality of light guide paths, each having a light entrance end facing the container cavity and a light exit end facing the light detection unit and configured to guide the light from the sample to the light detection unit; and a light absorbing unit for absorbing incident light, the light entrance end of each said light guide path being optically connected to the container cavity or optically connected to the container cavity via a transparent resin that transmits the light from the sample, and the light absorbing unit covering at least a part of a periphery of each said light guide path other than the light entrance end and the light exit end of the light guide path concerned.

6. The optical measurement apparatus according to claim 5 further comprising:

a light source for irradiating the sample with light; and an optical multilayer filter disposed between the light entrance ends and the light exit ends of the light guide path group.

7. The optical measurement apparatus according to claim 6 further comprising a color glass filter that absorbs light having a specific wavelength, the color glass filter being disposed between the optical multilayer filter and the light exit ends of the light guide path group.

8. The optical measurement apparatus according to claim 5, wherein each said light guide path includes a silicone resin portion that transmits the light from the sample, and optical material particles dispersed in the silicone resin portion, and a refractive index of the silicone resin portion and a refractive index of the optical material particles coincide with each other at a first wavelength, and do not coincide at a second wavelength different from the first wavelength.

9. An optical measurement method for use with an optical measurement device adapted to measure light from a sample, the optical measurement device including:

a container cavity for receiving a container that contains the sample;

a light detection unit for detecting light from the sample;

a light guide path group, which is defined by a plurality of light guide paths, each having a light entrance end facing the container cavity and a light exit end facing the light detection unit and configured to guide the light from the sample to the light detection unit; and a light absorbing unit for absorbing incident light, the light entrance end of each said light guide path being optically connected to the container cavity or optically connected to the container cavity via a transparent resin that transmits the light from the sample, and the light absorbing unit covering at least a part of a periphery of each said light guide path other than the light entrance end and the light exit end of the light guide path concerned, said method comprising:

an irradiation step of emitting light to the light guide path group; and a detection step of collectively detecting light from said plurality of light guide paths of the light guide path group.

* * * * *